(12) United States Patent
Klarhorst

(10) Patent No.: US 7,380,954 B2
(45) Date of Patent: Jun. 3, 2008

(54) FLOODLIGHT WITH ATOMISER

(76) Inventor: Günter Klarhorst, Eisgrundstrasse, Bielefeld (DE) 33699

( * ) Notice: Subject to any disclaimer, the term of this patent is extended or adjusted under 35 U.S.C. 154(b) by 0 days.

(21) Appl. No.: 10/583,270

(22) PCT Filed: Dec. 15, 2004

(86) PCT No.: PCT/EP2004/014256

§ 371 (c)(1),
(2), (4) Date: May 21, 2007

(87) PCT Pub. No.: WO2005/061954

PCT Pub. Date: Jul. 7, 2005

(65) Prior Publication Data
US 2007/0242454 A1 Oct. 18, 2007

(30) Foreign Application Priority Data
Dec. 19, 2003 (DE) ................. 103 59 778

(51) Int. Cl.
F21V 33/00 (2006.01)
(52) U.S. Cl. .......... 362/96; 362/101; 362/253; 362/414; 392/393; 392/394
(58) Field of Classification Search .......... 362/410, 362/414, 101, 96, 253, 154, 318, 263, 800; 261/79.1; 392/386, 394, 393
See application file for complete search history.

(56) References Cited

U.S. PATENT DOCUMENTS 6,488,393 B1* 12/2002 Burnham ............... 362/318

2006/0250795 A1* 11/2006 Langone ................. 362/253
2006/0255168 A1* 11/2006 Huang et al. ............. 239/18

FOREIGN PATENT DOCUMENTS

DE     354 383 C       6/1922
DE     297 13 945 U 1  10/1997
DE     202 16 671 U 1  2/2003

* cited by examiner

Primary Examiner—Laura Tso
(74) Attorney, Agent, or Firm—Browdy and Neimark

(57) ABSTRACT

Floodlight in a fluid-filled shell (3) with a medially arranged atomizer (7), whereby a light source (8) is permanently installed in a transparent, horizontal ring (9) around the atomizer (7) on a superior level, and an active surface (12) of the atomizer (7) is maintained free, characterized in that
  the floodlight is mounted centrally on a stand (2) with a shell holder (16), screw-fixed in a sealing manner.
  the ring (9) extends upwards in an arch above a bulb holder (10) and encloses the above in a sealing manner by means of screwing into the shell holder with seals (15).
  the atomizer (7) is tensioned in a seal (20) and fixed with a screw ring (18) below the bulb holder (10).
  a sealed space (14) for cable introduction is thus retained below the atomizer (7) and below the bulb holder (10) in the shell holder (16), the lines of which run through the stand (2).

17 Claims, 3 Drawing Sheets

FLOODLIGHT WITH ATOMISER

BACKGROUND OF THE INVENTION

1. Technical Field of the Invention

The invention relates to a floodlight in a fluid-filled shell with a medially arranged atomiser, whereby a light source is permanently installed in a transparent, horizontal ring around the atomiser at a superior level and an active surface of the atomiser is maintained free.

2. Prior Art

Such a floodlight is well known from the document DE 202 16 671 U1. It consists of a shell for a fluid the bottom of which is closed, inside of which is placed a crystal-like holder for an atomiser and a lighting, whereby their current supply is led into the shell across its edge. The lighting is inserted into holes, which have been drilled into the holder from the bottom. The atomiser is arranged in a lower position in the holder than the luminous elements, such as bulbs or light emitting diodes, and is accessible from above through a drilled hole allowing fluid and mist outlet. In one execution a reflector is arranged on spacers above the light holder. A simple assembly, as well as sealing and disassembly of the construction elements in the holder, is not intended.

Furthermore, a shell that is lit up from below and can be fed with fluid is well known from the document DE 201 03 621 U1, into which an atomiser is inserted, whereby its inlet runs across the edge of shell. The lighting of the shell from below makes this lamp unsuitable for an arrangement on a high stand.

Furthermore, a permanently installed atomiser in a fluid-filled shell is well known from the German application DE 297 13 945. This shell exhibits a foot containing a light source. Therefore the light is emitted essentially upward. If the foot is positioned on a piece of furniture, moisture damages can result from the precipitation of the mist on the furniture.

OBJECT AND SUMMARY OF THE INVENTION

It is the aim of the invention to improve the initially indicated floodlight so that it can easily be assembled and disassembled and that it ensures good illumination of the mist above and below the shell.

This object is met in such a way that
the floodlight is mounted centrally on a stand with a shell holder, screw-fixed in a sealing manner,
the ring extends upward in an arch above a bulb holder and enclosing the above in a sealing manner, by means of screwing into the shell holder with seals,
the atomiser is tensioned in a seal and fixed with a screw ring below the bulb holder,
a sealed space for cable introduction is thus retained below the atomiser and below the bulb holder in the shell holder, the lines of which run through the stand.

The light source is favourably installed permanently in the shell. Thus no change of the lighting effect occurs, even if the floodlight is moved. The execution of the light source in an elevated ring around the atomiser ensures a good illumination of the mist. The active surface of the atomiser is maintained free, in order not to impair the formation of mist.

The atomiser favourably is a piezoelectric ultrasonic transmitter. These are inexpensive and well protected against the influence of water and additives.

A bright floodlight results, if the light source consists of halogen bulbs. These are inexpensive and can easily be changed.

In another execution, a large number of light emitting diodes are used instead of halogen bulbs. These have a long life span and are indifferent to external influences.

The light emitting diodes preferably radiate white light, in order to enhance the mist effect. In another type of execution the light emitting diodes radiate red, yellow or green light, in order to let the floodlight produce a specific atmosphere.

In order to protect the light source from the fluid, it is arranged underneath a transparent cover, which can be screwed on. Thus a bulb change can easily be accomplished.

Favourably, the cover is shaped as a horizontal ring, arched upward, the centre of which is open. Thus the active surface of the atomiser is maintained free and the formation of mist is not impaired.

The electric power lines for the light source and the atomiser favourably run inside the stand and are led centrally into the shell from the bottom, so that they are not visible and do not impair the visual effect of the floodlight.

An output regulator is optionally connected upstream of the light source and/or the atomiser at the outside, by means of which the brightness and/or the mist density is adjustable.

Optionally, water-soluble flavour materials are added to the fluid, preferably water. Thus a pleasant smell in the room can be produced with this floodlight.

An attractive illuminating effect of the floodlights results from the use of a glass shell. The atmospheric impression caused by the floodlight is enhanced by a decoration of the glass shell.

The light impression is further changed, and a spray protection is achieved, by placing an additional shell at a distance above the light source and the atomisers on stay bolts of an appropriate length. The additional shell also produces light and shadow effects of the mist on ceilings and walls. The additional shell is removable. This increases evaporation and gives another light impression.

In order to achieve a uniform appearance, the additional shell is made from the same material and, if desired, decorated in the same way as the fluid-filled shell.

The atomiser produces a gaseous humidity, which is taken up by the room air. The height of the stand favourably amounts to more than 150 cm, so that the moisture absorption takes place in the air and the mist does not immediately condense on the supporting surface of the stand. A positive visual impression also results from the fact that one cannot look directly into the light source.

Types of execution of the invention are described in the figures by way of example.

DETAILED DESCRIPTION OF THE PREFERRED EMBODIMENT(S) OF THE INVENTION

Figure 1:
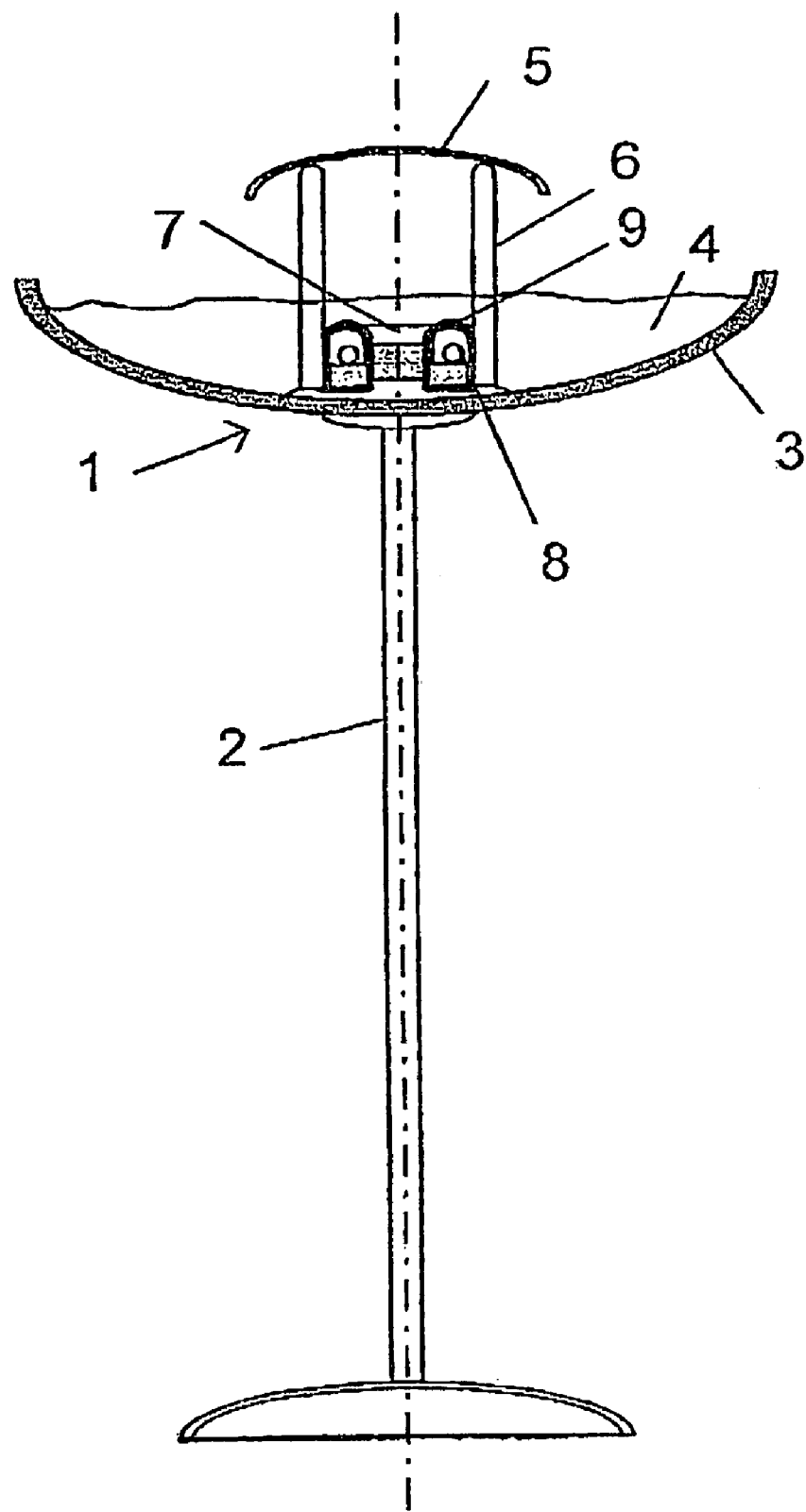
FIG. 1 shows a cross section of a floodlight.

In FIG. 1 a section of the floodlight 1 is represented in a view from the side. The shell 3 is fastened on the stand 2; it is preferably translucent and filled with a fluid 4. The atomiser 7 is situated in the centre of the shell and produces mist from the fluid 4. The atomiser 7 is surrounded by the light source 8, which illuminates the fluid and the mist. The transparent luminous ring 9 protects the light source 8 from the fluid 4. The stay bolts 6 are attached next to the luminous ring 9, supporting the additional shell 5 at a distance above the luminous ring 9.

Figure 2:
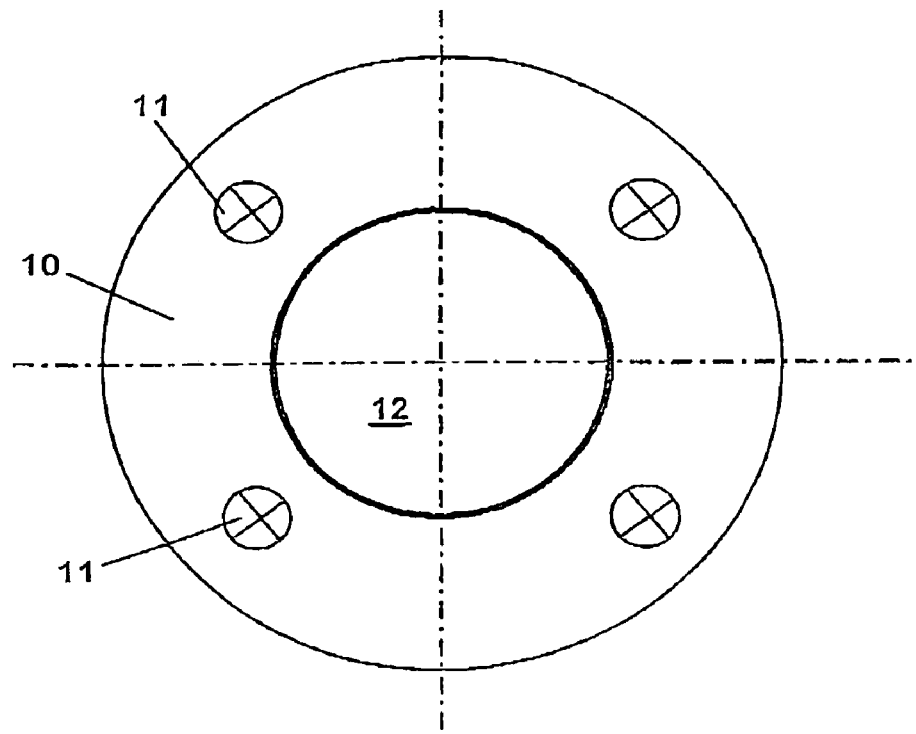
FIG. 2 shows a bulb holder with 4 bulbs.

FIG. 2 shows the bulb holder 10 in a horizontal projection. It holds the light sources, in this case four bulbs, which are for example low voltage halogen bulbs. The bulbs 11 are evenly distributed on the bulb holder 10, in order to attain uniformity of illumination. The active surface 12 of the atomiser is maintained free in the centre of the bulb holder 10. Here, the mist is produced and released upward.

Figure 3:
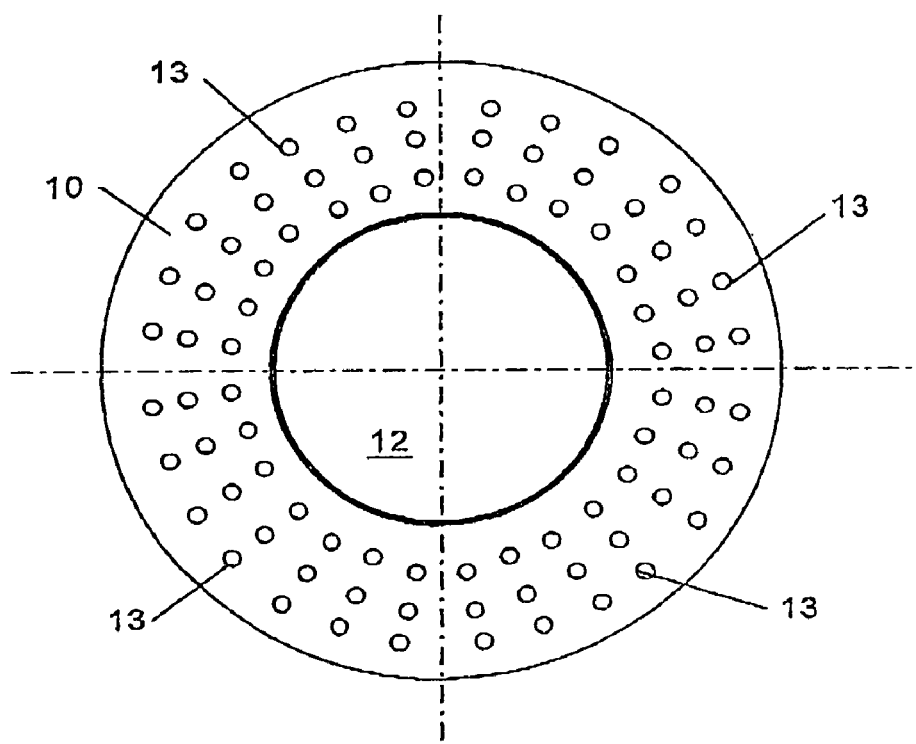
FIG. 3 shows a bulb holder with light emitting diodes.

In FIG. 3 a bulb holder 10 is represented with a large number of light emitting diodes 13, which are evenly distributed on the bulb holder. They produce a uniform illumination. Also here, the active surface 12 of the atomiser is maintained free.

Figure 4:
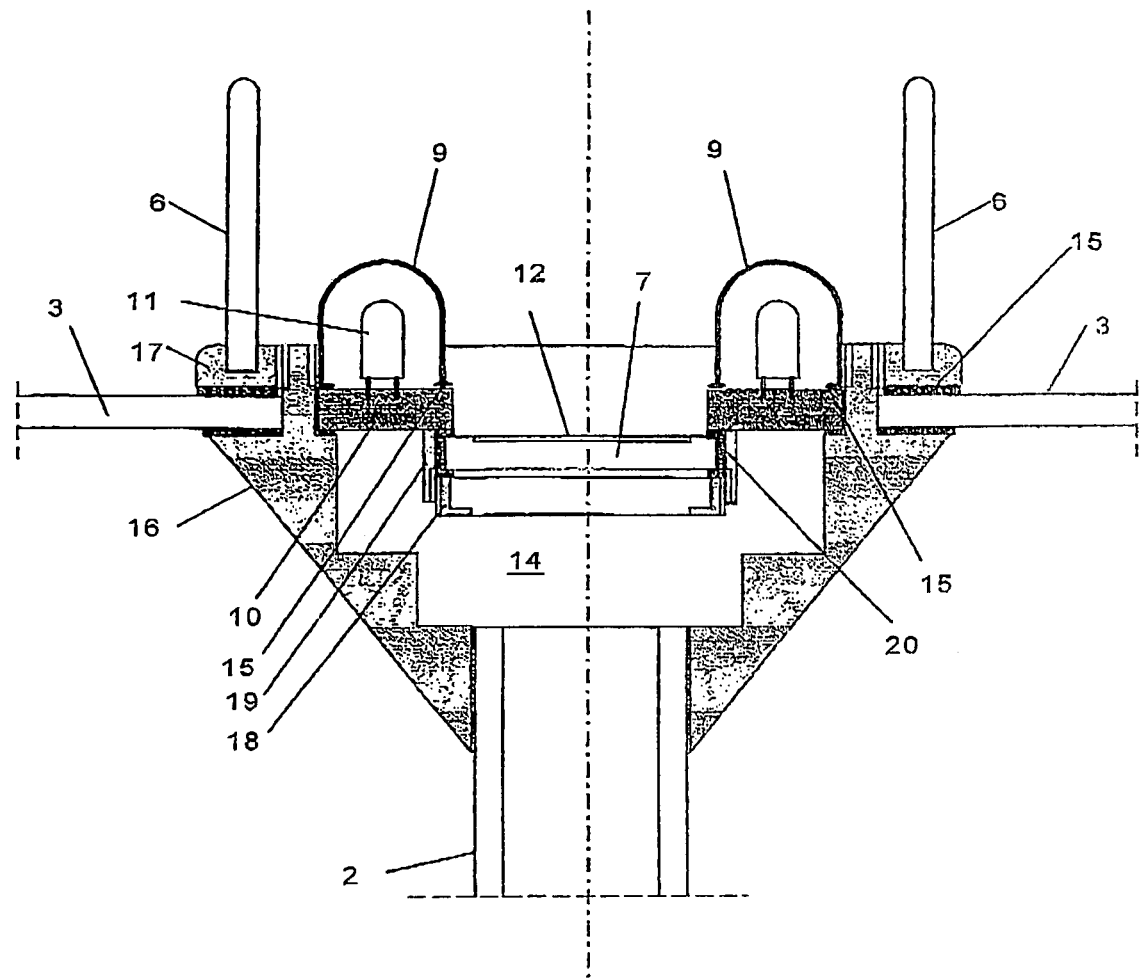
FIG. 4 shows a bulb holder and an atomiser in detail.

FIG. 4 shows a detailed section of the centre of the floodlight. The shell holder 16 is fastened on the stand 2. The shell 3 is attached to said holder by means of the attachment ring 17 and the seals 15. The attachment ring 17 is screwed onto the shell holder 16 and the stay bolts 6 are also inserted into ring 17, serving as a support for the additional shell 5. The bulb holder 10 is supported on a shoulder of the shell holder 16; and it supports the bulbs 11. The bulbs 11 are protected by the luminous ring 9, which is screwed on the inside of the shell holder 16. The interior of the bulbs 11 is sealed by means of seals 15. The atomiser 7 with its active surface 12 is situated in the centre of the luminous ring 9. The atomiser 7 is engaged in the stay 19 and in the seal 20 with the screw ring 18. Underneath the atomiser 7 the space 14 for the cable supply of the atomiser 7 and the bulbs 11 is retained.

LIST OF REFERENCE SYMBOLS 1 floodlight
2 stand
3 shell
4 fluid
5 additional shell
6 stay bolt
7 atomiser
8 light source
9 luminous ring
10 bulb holder
11 bulbs
12 active surface of atomiser
13 light emitting diodes
14 cable supply space
15 seal
16 shell holder
17 attachment ring
18 screw ring
19 stay ring

The invention claimed is:

1. Floodlight in a fluid-filled shell (3) with a medially arranged atomiser (7), whereby a light source (8) is permanently installed in a transparent, horizontal ring (9) around the atomiser (7) on a superior level, and an active surface (12) of the atomiser (7) is maintained free, wherein the floodlight is mounted centrally on a stand (2) with a shell holder (16), screw-fixed in a sealing manner;

the ring (9) extends upwards in an arch above a bulb holder (10) and encloses the light source (8) in a sealing manner by means of screwing into the shell holder with seals (15);

the atomiser (7) is engaged in a seal (20) and fixed with a screw ring (18) below the bulb holder (10); and a sealed space (14) for cable introduction through the stand (2) is retained below the atomiser (7) and below the bulb holder (10) in the shell holder (16).

2. Floodlight according to claim 1 wherein the atomiser (7) is a piezoelectric ultrasonic transmitter.

3. Floodlight according to claim 1, wherein the light source (8) consist of at least one halogen bulb (11).

4. Floodlight according to claim 1, wherein the light source (8) is formed by a large number of light emitting diodes (13).

5. Floodlight according to claim 4, wherein the light emitting diodes (13) radiate white light.

6. Floodlight according to claim 4, wherein the light emitting diodes (13) radiate red light.

7. Floodlight according to claim 1, wherein the light source (8) and the atomiser (7) are covered by an additional shell (5), which is placed at a distance above the light source (8) and the atomiser (7) on a stay bolt (6) in a removable manner.

8. Floodlight according to claim 2, wherein the additional shell (5) is made from the same material as the fluid-filled shell (3).

9. Floodlight according to claim 1, wherein a height of the stand (2) amounts to more than 150 cm, and that the fluid-filled shell (3) has a diameter between 40 and 100 cm.

10. Floodlight according to claim 1, characterized in that an output regulator is connected upstream of one of the light source (8) and the atomizer (7).

11. Floodlight according to claim 1, wherein water-soluble flavours are added to the fluid.

12. Floodlight according to claim 1, wherein the fluid-filled shell (3) is made from glass.

13. Floodlight according to claim 12, wherein the fluid-filled shell (3) is decorated.

14. Floodlight according to claim 4, wherein the light emitting diodes (13) radiate yellow light.

15. Floodlight according to claim 4, wherein the light emitting diodes (13) radiate green light.

16. Floodlight according to claim 1, wherein an output regulator is connected upstream of the atomiser (7).

17. Floodlight according to claim 1, characterized in that an output regulator is connected upstream of the light source and the atomiser.

* * * * *